United States Patent [19]

Schwiebert

[11] Patent Number: 5,160,224
[45] Date of Patent: Nov. 3, 1992

[54] CAM ACTION TWIST LOCK ASSEMBLY FOR FREIGHT CONTAINERS

[76] Inventor: Phillip Schwiebert, P.O. Box 612106, San Jose, Calif. 95161

[21] Appl. No.: 835,551

[22] Filed: Feb. 14, 1992

[51] Int. Cl.⁵ .............................................. B60P 1/64
[52] U.S. Cl. ...................................... 410/82; 24/287
[58] Field of Search ................. 410/82, 83; 294/81.53; 220/1.5; 24/287

[56] References Cited

U.S. PATENT DOCUMENTS

| | | | |
|---|---|---|---|
| 2,963,310 | 12/1960 | Abolias | 410/82 X |
| 3,593,387 | 7/1971 | Georgi | 24/287 X |
| 3,717,372 | 2/1973 | Carr | 410/82 |
| 3,734,445 | 5/1973 | Werner et al. | 410/83 |
| 3,866,970 | 2/1975 | Schwiebert | 410/83 |
| 3,989,294 | 11/1976 | Carr | 410/82 |
| 4,782,561 | 11/1988 | Hayama | 24/287 |
| 5,002,418 | 3/1991 | McCown et al. | 410/82 X |

FOREIGN PATENT DOCUMENTS 246951 6/1987 German Democratic Rep. ... 410/82

Primary Examiner—Michael S. Huppert
Assistant Examiner—William M. Hienz
Attorney, Agent, or Firm—Alfred Walker

[57] ABSTRACT

A cam action twist lock container support assembly is provided to support freight containers upon a standard flatbed truck trailer. The support includes a cam activated twist lock assembly, which lowers the base of a locking cone of the support assembly continuously down until the locking cone has rotated 90 degrees into a locking position within each of the container supports of the freight container. A corresponding cam surface for a rotating handle, which transmits a mechanical power to the rotating locking cone, thereby ensures the locking cone within the corresponding container support. For easy carrying, the cam activated twist lock assembly may be attached to hinged, fold away support portions which rotate downward towards a standard trailer side rail to a rest position, such that the cam action twist lock assembly rotates away from a vertical position of use and stores within the outer dimensional limits of the trailer.

2 Claims, 3 Drawing Sheets

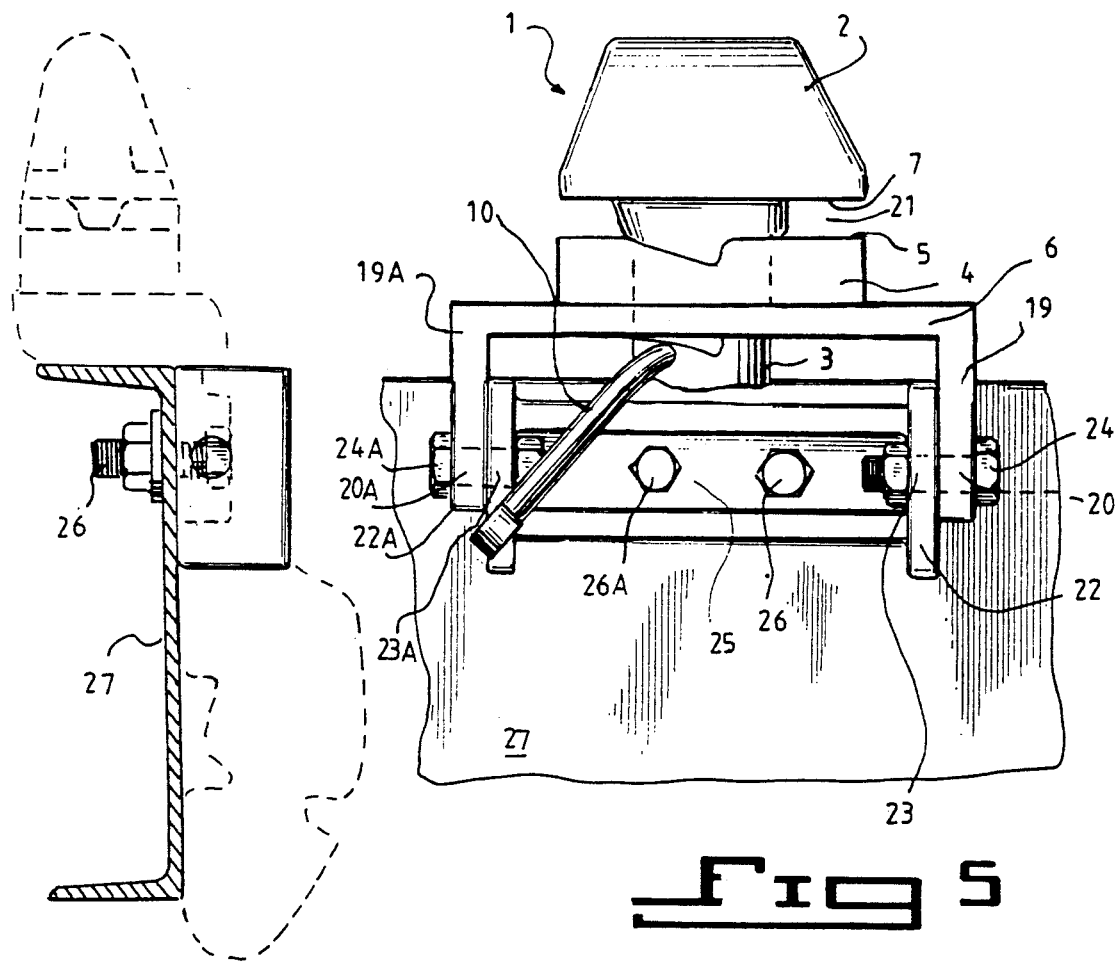
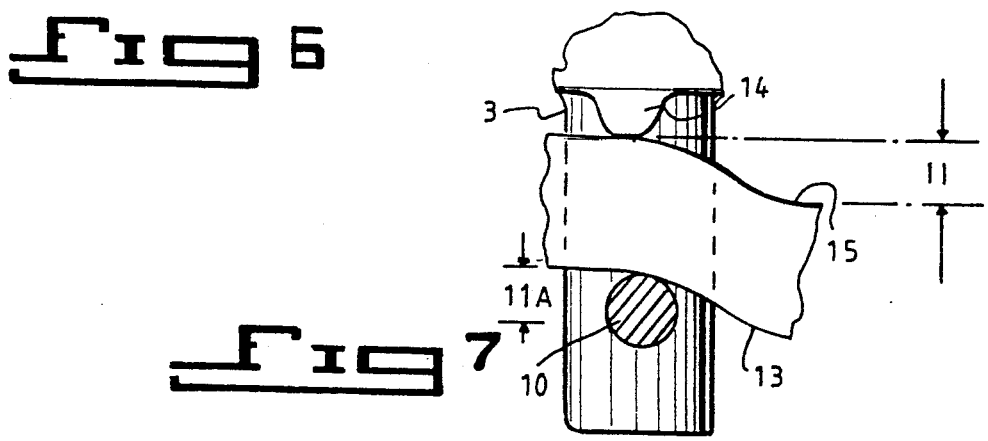

CAM ACTION TWIST LOCK ASSEMBLY FOR FREIGHT CONTAINERS

BACKGROUND OF THE INVENTION

This invention relates to a cam action, twist lock assembly support for freight containers, more specifically, to a rotatable twist lock assembly which rotates to a vertical position of use for insertion within the hollow supports of a freight container and, when not in use, rotates to a rest position against a flatbed side rail.

Various attempts have been made to provide a twist lock for freight containers, such as U.S. Pat. No. 3,866,970 of the Applicant herein.

The prior art does not disclose a cam action, downward movement of a twist lock assembly for locking a freight container into securely in place by means of a locking support, which support is also foldable, rotatably against a flatbed trailer side rail support for easy carrying. In the present invention, one feature includes a cam follower, integral with a twist lock locking cone, which cam follower slides down along a cam surface, when the direction of the twist lock locking cone rotates 90 degrees to a locking position, within the hollow supports of a container.

Furthermore, for convenience and safety reasons, another feature of the twist lock assembly is found in that the twist lock assembly is foldable away into a position of non-use against a standard side rail of a flatbed trailer.

Previous attempts to provide a twist lock assembly have provided an assembly leaving a gap of space of approximately 5/16" between the bottom of a locking cone and the surface over which the locking cone rotates. The gap is undesirable, since it results in considerable vibrating of the freight container, resulting in potential damage to the shipping contents and the container support itself.

In addition, various attempts have been made with respect to a twist lock structure which can be folded away in a position of non-use. However, such fold away locking assemblies require extensive structural modifications to the flatbed trailer.

Furthermore, the prior art twist lock assemblies do not describe a smooth locking mechanism, with a locking cone which moves in a rotatable manner following a cam follower down a cam surface as the present invention provides.

The present invention improves upon the prior art by providing not only a cam action twist lock assembly, but also a rotatable foldaway locking assembly which is easily stored away when not in use within the outer dimensional limits of the flatbed trailer. The present invention provides stability by moving the locking cone, and a handle for the locking cone, downwardly along a curved cam surface to provide stability when locking the locking cone in place within the hollow container support housing.

OBJECTS OF THE INVENTION

It is therefore an object of the invention to provide a cam action twist lock assembly for securing freight containers to flatbed truck trailers.

It is a further object to provide a rotatable locking assembly which can be stored away when not in use within the outer dimensional limits of the trailer.

It is a further object to provide a stable, twist lock assembly for freight containers that firmly locks the container to the trailer.

It is a further object to provide an for an inexpensive mounting of the twist lock assembly to the trailer side rail.

It is further object to provide a twist lock assembly which has structural strength and integrity.

SUMMARY OF THE INVENTION

In furthername of the aforesaid objects, the present invention provides a new and useful freight container twist lock assembly, built of rugged unit construction, incorporating a new "cam action twist lock" that firmly locks the freight container to a flatbed truck trailer. The cam action lock prevents the destructive rough road vibration characteristic of standard twist locks. The present invention is designed for inexpensive mounting on flatbed trailers to be adapted for container hauling, and it includes a "flip down" feature that leaves the trailer deck clear to have other commodities.

The present invention is designed for simple bolt application to flatbed trailers. The use of flatbeds to double in container hauling has increased the need for a safe, convenient mechanism to secure the container to the flatbed surface. The present method of unreliable chain securement of large 8 feet wide containers is cumbersome at best and marginal in road safety. The present invention solves this securement problem, and, when not in use, the present invention may be folded against the trailer side rail, leaving a flush deck and a standard 96" trailer width.

The present invention includes a twist lock assembly for freight containers, of an advanced design, including the following features and benefits:

The preassembled unit construction permits direct bolting to a flatbed trailer side rail. The configuration is ambidextrous, that is, it can be used, on either the left or right side, with the rugged design using a 5/8" operating handle with "pull out" strength exceeding 20,000 lbs.

The present invention tightly locks a container to a trailer, eliminating the destructive rough road vibration of empty containers mounted on standard twist locks. An embedded compression spring provides a stable lock at any point in the rotation cycle of the locking cone within a freight container support.

The twist lock assembly has been designed for minimum production and assembly costs, to insure an "installed cost" better than standard twist lock designs.

The preferred embodiment provides an upper support portion to support a freight container, which upper support portion is also foldable about a side carrier portion secured to a conventional flatbed trailer side rail. The upper support portion includes a support platform, generally cast metal, supporting a twist lock locking cone, which locking cone secures the freight container to a conventional flatbed trailer. The upper support portion folds downward and is hingeably attached to a lower support hinge block portion secured to the side rail of a flatbed trailer.

The locking cone is secured to an axial shaft, which shaft has disposed to it a first cam follower lug or protrusion, which slides along a first cam surface, carved out of a supporting abutment member. The first cam follower protrusion slides along the first cam surface of the supporting abutment in a complimentary reciprocal manner to the movement of a movable handle, an upper portion of which handle acts as a second cam follower. The movable handle, acting as the second cam follower, rotates likewise along a second cam surface disposed below the support portion of the twist lock assembly.

BRIEF DESCRIPTION OF THE DRAWINGS

FIG. 5 is a side elevational view of the device when mounted.

FIG. 6 is a front elevational view of the device, showing in dotted lines the device in an up position of use and a down position of non-use.

FIG. 7 is a schematic diagram of the cam action portion of the device showing the downward distance of the travel of the upper and lower cam followers along the respective cam surfaces.

DETAILED DESCRIPTION OF THE PREFERRED EMBODIMENT

Figure 1:
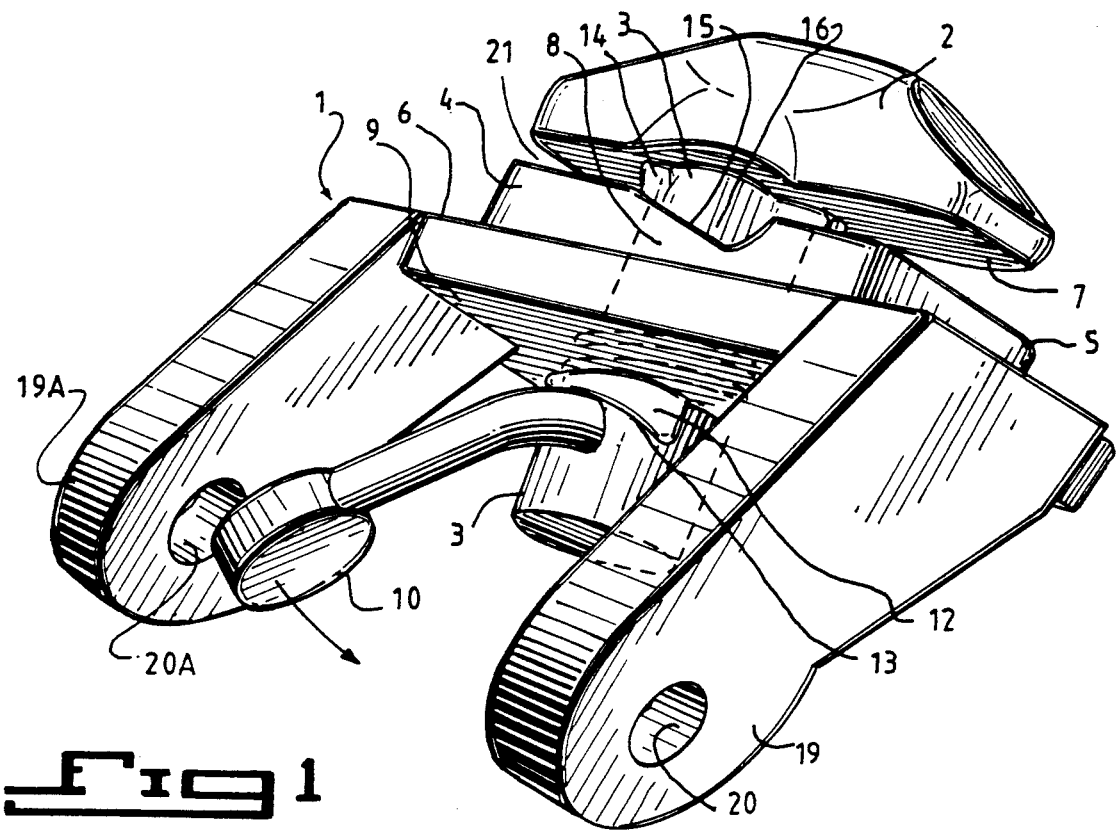
FIG. 1 is a bottom perspective view of the locking portion of the device.
Figure 2:
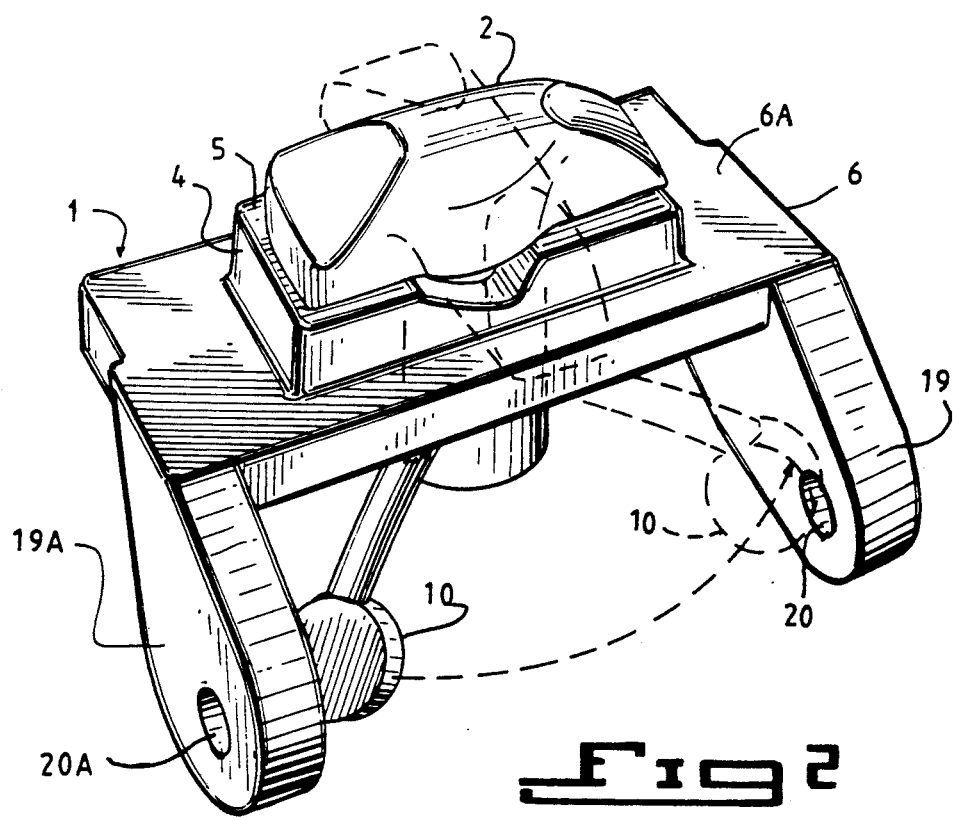
FIG. 2 is a upper perspective view of the device showing in dotted lines the locking cone and handle in a locked position.

As shown in FIGS. 1-7, there is shown a cam action twist lock assembly, including support block 1 which is mountable upon side rail 27 of a conventional flatbed trailer. The device includes generally a locking means, such as locking cone 2, which is rotated in a locking position, as shown in FIGS. 1-7, such that the container, having a hollow support with a reciprocal orifice for entry of the locking cone 2, is supported upon twist lock assembly support 1 during transportation by a conventional flatbed trailer.

As shown in FIG. 6, the cam action twist lock assembly support block 1, including a locking means, such as locking cone 2, is in use in a vertical position of use, and may be rotated downward in a foldaway position from the position of use to a position of non-use against the side rail 27 of the flatbed trailer.

As shown in FIG. 1-6, the assembly support block 1 includes a locking means, such as locking cone 2, which is rotated 90 degrees about an upper surface 5 of annular abutment 4, which annular abutment 4 extends upward from upper surface 6A of support platform 6. Locking cone 2 is rotatable by means of handle 10 about curved upper surface 5 of annular abutment 4.

As shown in FIGS. 1-6, cam action twist lock assembly support block 1, includes locking cone 2, which is secured atop rotatable shaft 3. The shaft 3 is rotatable within annular abutment 4, extending upward from support platform 6, which abutment 4 has upper surface 5 and centrally located aperture 8, which aperture 8 extends through annular abutment 4 and support platform 6 of locking assembly support block 1. Locking cone 2 has undersurface 7, which undersurface 7 rotates 90 degrees until it is adjacent to the upper surface 5 of annular abutment 4.

A cam action subassembly permits the under surface 7 of locking cone 2 to slide firmly down until under surface 7 is adjacent to upper surface 5 of annular abutment 4, by means of first cam follower protrusion 14 of shaft 3, which first cam follower protrusion 14 slides downward along first cam surface 15 within wedged-shaped cavity 16 of annular abutment 4. Shaft 3 is movable within centrally located aperture 8 of support block 1, with aperture 8 having a vertical axis. Shaft 3 extends below lower surface 9 of support platform 6 with lower surface 9. Lower surface 9 of support platform 6 bears a second protrusion 12, which second protrusion bears a second cam surface 13. An upper portion of handle 10 slides about second cam surface 13 in a travel which is reciprocal to the travel of first cam follower protrusion 14 in sliding along first cam surface 15 of annular abutment 4.

Support 1 also contains downward extensions 19 and 19A between which handle ;0 and shaft 3 rotate, which downward extensions 19 and 19A have holes 20 and 20A, which holes 20 and 20A are provided for the rotation of twist lock assembly support block 1 about hinge block 25 connected to trailer side rail 27. When the locking cone 2 is in a position of use with a longitudinal axis parallel to the longitudinal axis of annular abutment 4, there is provided a vertical gap 21 between the lower surface 7 of locking cone 2 and the upper surface 5 of the annular abutment 4. However, when locking cone 2 is rotated 90 degrees in the locking position of use, as shown in dotted lines in FIG. 2, the gap 21 is reduced to zero from the sliding down of locking cone 2, by virtue of the cam action of first cam follower protrusion 14 sliding down 90 degrees along first cam surface 15 within wedge-shaped cavity 16 of annular abutment 4.

Figure 3:
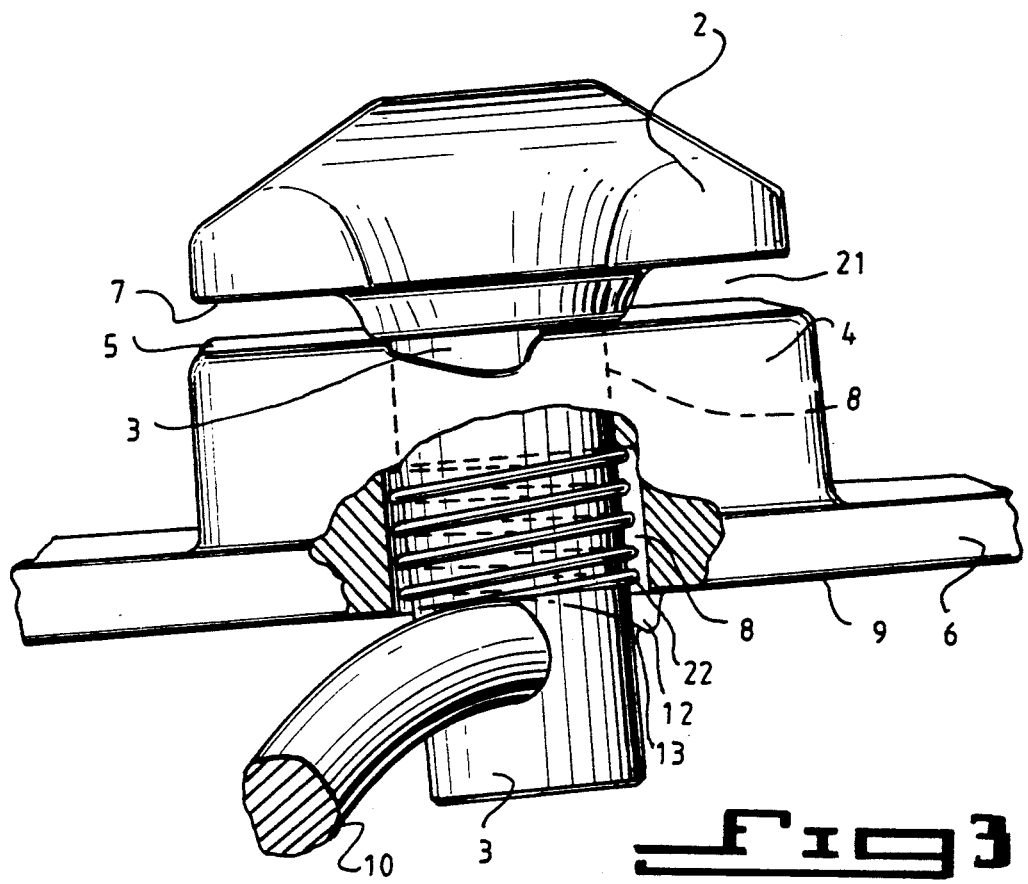
FIG. 3 is a side elevational view of the locking portion of the device in partial section showing the interior in an open position.
Figure 4:
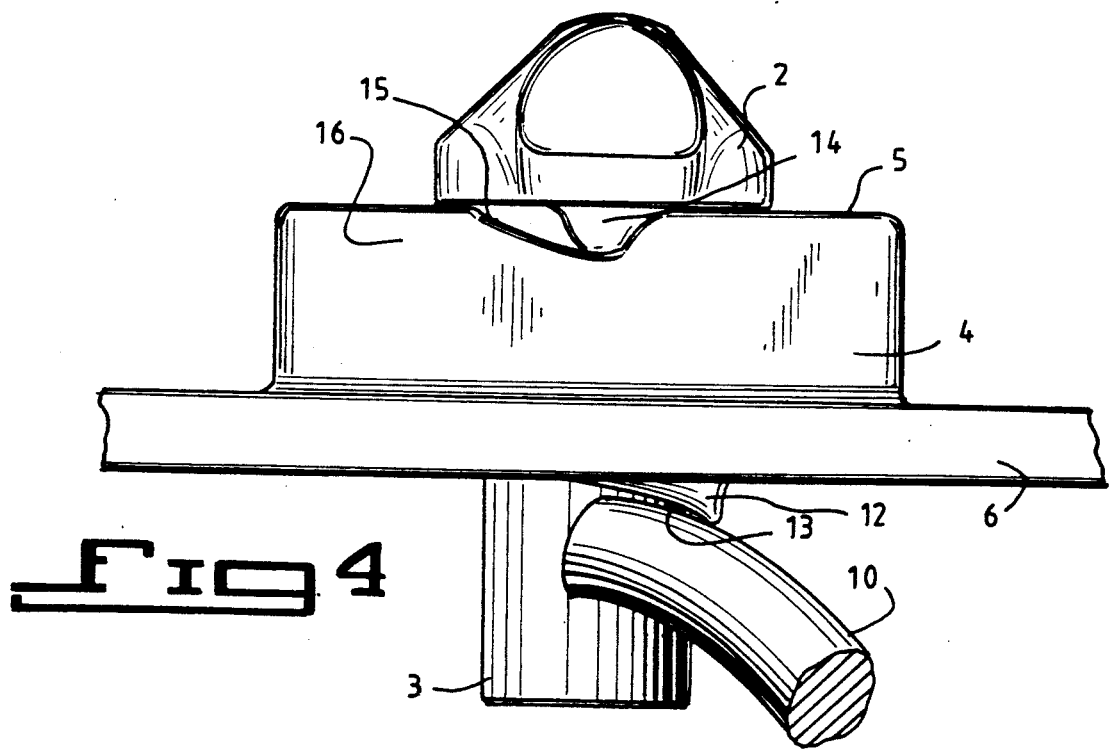
FIG. 4 is a side elevational view of the locking portion of the device in a locked position.

As shown in FIG. 3, internal coil spring 22 is provided to exert downward pressure upon handle 10, to maintain pressure upon handle 10 as handle 10 rotates, as a second cam follower along second cam surface 13 of protrusion 12, extending from the lower surface 9 of support platform 6, to a locking position. As also shown in FIG. 4, locking cone 2 has been rotated 90 degrees in a movement consistent with the movement of first cam follower 14 along first cam surface 15 within cavity 16. First cam follower 14 travels down between cam surface 15 and the horizontal top plane of annular abutment 4. FIG. 4 also depicts handle 10 having travelled along second cam surface 13 of second cam protrusion 12.

The cam action twist lock assembly results in the freight container being tightly locked to either a conventional container chassis (not shown), or to the flatbed container side rail, which eliminates destructive rough road vibrations of empty containers mounted on standard twist locks. The embedded compression spring 22 provides a stable lock at any point in the rotation cycle of the locking cone 2 and shaft 3 within the aperture 8 of twist lock assembly support block 1.

As shown in FIGS. 5 and 6, the present invention provides a twist lock assembly which can be firmly locked to the side of a flatbed trailer. It is designed for simple bolt attachment to flatbed trailers. This allows flatbed trailers to double in container hauling directions by means of a safe, convenient mechanism to secure the freight container to the truck rig. The mechanism to secure the container includes the downward extensions 19 and 19A of support platform 6 having apertures 20 and 20A respectively, the apertures 20 and 20A co-axially adjacent to apertures 23 and 23A of support bracket extensions 22 and 22A of hinge block support bracket 25, having therein apertures 23 and 23A. The downward extensions 19 and 19A are locked by conventional fastening means 24 and 24A, such as a nut and bolt combination. The hinge block support bracket 25 is connected by bolts 26, 26A to trailer side rail 27 of the flatbed trailer.

As further shown in FIG. 6, the locking support block 1 is shown in dotted lines in both an upper position in use and a lower position in non-use, wherein the support block 1 is folded downward against the surface of trailer side rail 27 by means of conventional fastening means 24 and 24A and hinge block support bracket 25. This hinge block support bracket 25 may be conventionally attached to side rail 27 without any major modifications to trailer side rail 27, except for the intermittent cutting away of portions of a side rail chain (not shown) of the trailer side rail 27, so that the hinge block support bracket 25 can be flush against the vertical surface of flatbed trailer side rail 27.

As shown in the schematic view in FIG. 7, which depicts the cam action vertical displacement travel of the twist lock assembly, there is shown vertical gap 11, which is equal in vertical displacement to second vertical gap 11A below the first vertical gap. The vertical gap 11 corresponds to the vertical displacement of cam follower protrudance 14 of shaft 3 of twist lock cone 2 along cam surface 15. Vertical gap 11 also corresponds to the vertical displacement gap 21 between bottom 7 of locking cone 2 and top surface 5 of annular abutment 4.

Likewise, vertical gap 11A represents the vertical displacement of handle 10 acting as a cam follower along second cam protrudance 12 having curved cam surface 13, along which handle 10 travels from a position of non-use to a locking position to use, while shaft 3 rotates 90 degrees into the position of locking use.

Other embodiments may be encompassed in the invention. For example, the support block 1 may be attached to a conventional container hauling chassis, instead of being secured to side rail 27 as shown.

It should be clear that other embodiments of the invention may be constructed, without departing from the scope of the invention, as defined in the following claims.

I claim:

1. A twist lock assembly for freight containers comprising in combination:
    a support block,
    a locking cone having a shaft rotatable within an aperture of said support block, said shaft having a handle for rotation of said locking cone secured to said shaft into a locking position;
    said support block further including a first cam assembly, said first cam assembly including a first cam follower protrusion secured to said locking cone, said first cam follower protrusion slidable along a first cam surface indented within said support block, said first cam follower protrusion being slidable down said first cam surface for a first travel distance having a first vertical displacement;
    said handle being a second cam follower sliding along a second cam surface formed by a wedge shaped second protrusion extending from a bottom surface of said support block, said handle being slidable down along said second cam surface for a second distance having a vertical displacement equal to said first vertical displacement,
    said handle biased away from said second cam surface by a compression spring means.

2. The invention as in claim 1 wherein said support block comprises a support platform having an aperture therethrough, an annular abutment projecting upward from an upper surface of said support platform, said annular abutment having an aperture coaxial with said aperture of said support platform, said annular abutment aperture allowing rotation of said shaft of said locking cone within said aperture of said annular abutment and within said support platform;
    said support block and said indented first cam surface forming a wedge shaped cavity into which the first cam follower protrusion slides;
    said second cam surface extending downwardly and being formed on a second protrusion secured to a lower surface of said support platform, said handle sliding along said second cam surface as said handle rotates, said handle being biased downward by the force of said compression spring means, said spring means being wound around said shaft and being located within said platform;
    the distance between said locking cone and said annular abutment being reduced to zero when said locking cone is rotated 90 degrees into the locking position.

* * * * *